United States Patent
Tao et al.

(10) Patent No.: US 12,058,609 B2
(45) Date of Patent: *Aug. 6, 2024

(54) USER EQUIPMENT AND BASE STATION PARTICIPATING IN A SYSTEM INFORMATION ACQUISITION PROCEDURE

(71) Applicant: Panasonic Intellectual Property Corporation of America, Torrance, CA (US)

(72) Inventors: Ming-Hung Tao, Langen (DE); Hidetoshi Suzuki, Kanagawa (JP); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,898

(22) Filed: May 12, 2023

(65) Prior Publication Data

US 2023/0284125 A1 Sep. 7, 2023

Related U.S. Application Data

(63) Continuation of application No. 17/448,673, filed on Sep. 23, 2021, now Pat. No. 11,690,000, which is a
(Continued)

(30) Foreign Application Priority Data

Jun. 16, 2017 (EP) ..................................... 17176512

(51) Int. Cl.
*H04W 4/00* (2018.01)
*H04W 36/32* (2009.01)
(Continued)

(52) U.S. Cl.
CPC ........... *H04W 48/16* (2013.01); *H04W 36/32* (2013.01); *H04W 48/10* (2013.01); *H04W 60/04* (2013.01); *H04W 74/0833* (2013.01)

(58) Field of Classification Search
CPC ..... H04W 48/16; H04W 36/32; H04W 48/10; H04W 60/04; H04W 74/0833; H04W 48/12
(Continued)

(56) References Cited

U.S. PATENT DOCUMENTS

| | | | |
|---|---|---|---|
| 8,588,085 B2 | 11/2013 | Kang et al. | |
| 10,004,089 B2 * | 6/2018 | Lee | H04W 74/0841 |

(Continued)

FOREIGN PATENT DOCUMENTS

| | | |
|---|---|---|
| CN | 108632766 A | 10/2018 |
| RU | 2428815 C2 | 9/2011 |

(Continued)

OTHER PUBLICATIONS

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
(Continued)

*Primary Examiner* — Amancio Gonzalez
(74) *Attorney, Agent, or Firm* — Seed IP Law Group LLP

(57) ABSTRACT

The present disclosure relates to a user equipment comprising a receiver receiving a minimum-system-information message from a first radio base station. System information for the first radio cell that can be acquired by the UE is carried within the minimum-SI message and one or more additional-SI messages. The minimum-SI message includes system information for accessing the first radio cell and at least one system information index, each of which is asso-
(Continued)

ciated with one of the additional-SI messages. The SI message index comprises a value tag and an area pointer, the latter pointing to one area already defined. Processing circuitry determines whether the UE had already acquired before the additional-SI message associated with the same value tag and the same area. If the determination is positive, the processing circuitry determines that system information included in said additional-SI message acquired before is applicable to the first radio cell.

6 Claims, 7 Drawing Sheets

Related U.S. Application Data continuation of application No. 16/618,471, filed as application No. PCT/EP2018/065154 on Jun. 8, 2018, now Pat. No. 11,160,009.

(51) Int. Cl.
*H04W 48/10* (2009.01)
*H04W 48/16* (2009.01)
*H04W 60/04* (2009.01)
*H04W 74/0833* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 10,142,916 | B2 * | 11/2018 | da Silva | H04W 8/02 |
| 10,182,330 | B2 * | 1/2019 | Pazos | H04M 3/00 |
| 10,390,331 | B2 * | 8/2019 | Adjakple | H04W 4/06 |
| 10,455,621 | B2 * | 10/2019 | Agiwal | H04W 48/12 |
| 10,462,823 | B2 | 10/2019 | Ishii | |
| 10,505,799 | B2 * | 12/2019 | Mallick | H04L 5/0091 |
| 10,757,635 | B2 * | 8/2020 | Lindheimer | H04W 48/02 |
| 10,880,868 | B2 * | 12/2020 | Adjakple | H04W 76/10 |
| 11,095,413 | B2 | 8/2021 | Xiao et al. | |
| 11,160,009 | B2 | 10/2021 | Tao et al. | |
| 11,399,333 | B2 | 7/2022 | Wei et al. | |
| 11,690,000 | B2 * | 6/2023 | Tao | H04W 60/04 370/329 |
| 2009/0303953 | A1 * | 12/2009 | Kang | H04W 68/025 370/329 |
| 2015/0223148 | A1 * | 8/2015 | Shi | H04W 52/0216 370/312 |
| 2015/0282157 | A1 * | 10/2015 | Kim | H04W 72/21 370/329 |
| 2017/0164419 | A1 | 6/2017 | Kim | |
| 2018/0132166 | A1 * | 5/2018 | Ishii | H04W 48/10 |
| 2018/0167918 | A1 * | 6/2018 | Ishii | H04W 72/23 |
| 2019/0174554 | A1 * | 6/2019 | Deenoo | H04W 72/0453 |
| 2019/0230712 | A1 * | 7/2019 | Ou | H04W 74/0833 |
| 2020/0068477 | A1 * | 2/2020 | Awada | H04W 48/12 |

FOREIGN PATENT DOCUMENTS

| | | |
|---|---|---|
| RU | 2507685 C2 | 2/2014 |
| WO | WO 2016198909 A1 | 12/2016 |
| WO | WO 2018060903 A1 | 4/2018 |
| WO | WO 2018066922 A1 | 4/2018 |

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.

3GPP TR 38.913 V14.2.0, "3rd Generation Partnership Project; Technical Specification Group Radio Access Network; Study on Scenarios and Requirements for Next Generation Access Technologies; (Release 14)," Mar. 2017, 38 pages.

3GPP TS 24.301 V14.3.0, "3rd Generation Partnership Project; Technical Specification Group Core Network and Terminals; Non-Access-Stratum (NAS) protocol for Evolved Packet System (EPS); Stage 3 (Release 14)," Mar. 2017, 476 pages.

3GPP TS 36.304 V14.2.0, "3rd Generation Partnership Project; Technical Specification Group Radio Access Network; Evolved Universal Terrestrial Radio Access (E-UTRA); User Equipment (UE) procedures in idle mode (Release 14)," Mar. 2017, 49 pages.

3GPP TS 36.321 V14.1.0, "3rd Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.

3GPP TS 36.331 V14.1.0, "3rd Generation Partnership Project; Technical Specification Group Radio Access Network; Evolved Universal Terrestrial Radio Accss (E-UTRA); Radio Resource Control (RRC); Protocol specification (Release 14)," Dec. 2016, 654 pages.

3GPP TS 36.331 V14.2.2, "3rd Generation Partnership Project; Technical Specification Group Radio Access Network; Evolved Universal Terrestrial Radio Accss (E-UTRA); Radio Resource Control (RRC); Protocol specification (Release 14)," Apr. 2017, 721 pages.

3GPP TS 36.423 V14.2.0, "3rd Generation Partnership Project; Technical Specification Group Radio Access Network; Evolved Universal Terrestrial Radio Access Network (E-UTRAN); X2 application protocol (X2AP) (Release 14)," Mar. 2017, 242 pages.

3GPP TS 38.300 V0.2.0, "3rd Generation Partnership Project; Technical Specification Group Radio Access Network; NG Radio Access Network; Overall Description; Stage 2 (Release 15)," May 2017, 33 pages.

3GPP TS 38.300 V0.4.1, "3rd Generation Partnership Project; Technical Specification Group Radio Access Network; NG Radio Access Network; Overall Description; Stage 2 (Release 15)," Jun. 2017, 55 pages.

CATT, "Indexed SI in NR," R2-1700976, Agenda Item: 10.2.2.4, 3GPP TSG-RAN WG2 #97, Athens, Greece, Feb. 13-17, 2017. (3 pages).

CATT, "Indexed SI in NR," R2-1703110 (Revision of R2-1700976), Agenda Item: 10.4.1.4, 3GPP TSG-RAN WG2 #97bis, Spokane, USA, Apr. 3-7, 2017, 2 pages.

CATT, "Indexed SI in NR," R2-1704239 Resubmission of R2-1703110, Agenda Item: 10.4.1.5, 3GPP TSG-RAN WG2 #98, Hangzhou, China, May 15-19, 2017. (2 pages).

CATT, "SI Change Notification in NR," R2-1703109 Revision of R2-1700977, Agenda Item: 10.4.1.4, 3GPP TSG-RAN WG2 Meeting #97bis, Spokane, USA, Apr. 3-7, 2017. (3 pages).

Ericsson, "Stored system information: Indexing and Validity," Tdoc R2-1704388, Agenda Item: 10.4.1.5, 3GPP TSG-RAN WG2 #98, Hangzhou, P.R, of China, May 15-19, 2017. (6 pages).

Extended European Search Report, dated Sep. 14, 2017, for corresponding European Application No. 17176512.6-1854, 16 pages.

HTC, et al., "Discussion on validity of other SI," R2-1700294, Agenda Item: 3.2.2.4, 3GPP TSG-RAN WG2 NR Ad Hoc, Spokane, USA, Jan. 17-19, 2017. (2 pages).

Huawei (Rapporteur), "Summary of email discussion [82#13][Joint/ MTCe] Evaluation of extended DRX cycles for UEPCOP," R2-132893, Agenda Item: 5.2.2, 3GPP TSG-RAN WG2 #83, Barcelona, Spain, Aug. 19-23, 2013. (23 pages).

Huawei et al., "Structure of SIB Index/Identifier," R2-1705179, Agenda Item: 10.4.1.5, 3GPP TSG-RAN WG2 Meeting #98, Hangzhou, China, May 15-19, 2017, 3 pages.

Huawei, et al., "Further Considerations of "Other Si"," R2-167580, Agenda item: 9.2.2.2, 3GPP TSG-RAN2 Meeting #96, Reno, Nevada, USA, Nov. 14-18, 2016. (6 pages).

Intel Corporation, "Index based system information provisioning," R2-1701738, Agenda item: 10.2.2.4, 3GPP TSG-RAN WG2 Meeting #97, Athens, Greece, Feb. 13-17, 2017, 4 pages.

(56) References Cited

OTHER PUBLICATIONS

InterDigital Communications, "Validity of System Information in NR," R2-1702878, Agenda Item: 10.4.1.4, 3GPP TSG-RAN WG2 Meeting #97bis, Spokane, Washington, Apr. 3-7, 2017, 4 pages.
International Search Report, dated Aug. 29, 2018, for corresponding International Application No. PCT/EP2018/065154, 4 pages.
LG Electronics Inc., "Index based system information," R2-1703599, Agenda item: 10.4.1.4, 3GPP TSG-RAN WG2 Meeting #97bis, Spokane, USA, Apr. 3-7, 2017, 2 pages.
MediaTek Inc., "Remaining issues for DCI format design," R1-157384, Agenda Item: 6.2.1.7, 3GPP TSG-RAN WG1 Meeting #83, Anaheim, USA, Nov. 15-22, 2015. (3 pages).
Notice of Reasons for Rejection, dated Mar. 1, 2022, for Japanese Patent Application No. 2019-568216, 9 pages. (with English translation).
Russian Office Action dated Apr. 30, 2021, for the corresponding Russian Patent Application No. 2019134307/07, 19 pages. (With English Translation).
Samsung, "On Demand SI: Index based approach," R2-1703327, Agenda item: 10.4.1.4, 3GPP TSG-RAN WG2 Meeting #97bis, Spokane, USA, Apr. 3-7, 2017, 4 pages.
Vivo, "SI Change Notification," R2-1704582, Agenda Item: 10.4.1.5, 3GPP TSG-RAN WG2 Meeting #98, HangZhou, China, May 15-19, 2017. (5 pages).
ZTE, "Considerations on system information change," R2-162358, Agenda item: 7.14.2.2, 3GPP TSG-RAN WG2 Meeting #93bis, Dubrovnik, Croatia, Apr. 11-15, 2016. (5 pages).
Panasonic, "The format of the SI index/identifier," R2-1707203, Agenda Item: 10.4.1.5.2, 3GPP TSG-RAN WG2-NR#2, Qingdao, China, Jun. 27-29, 2017. (3 pages).
Qualcomm Incorporated, "SI index/identifier," R2-17xxxx, Agenda item: 10.4.1.5.2, 3GPP TSG-RAN WG2 Meeting #NR ad-hoc 2, Qingdao, China, Jun. 27-30, 2017. (5 pages).

\* cited by examiner

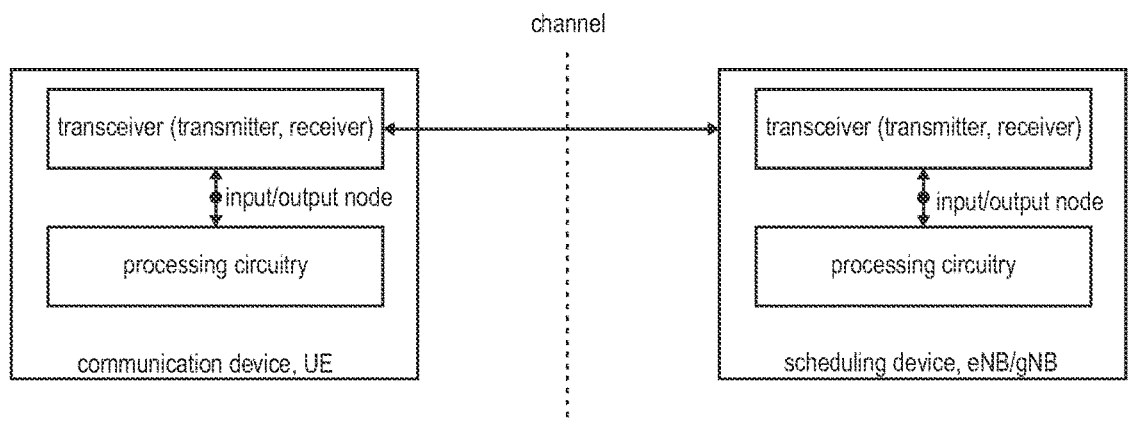
Fig. 10
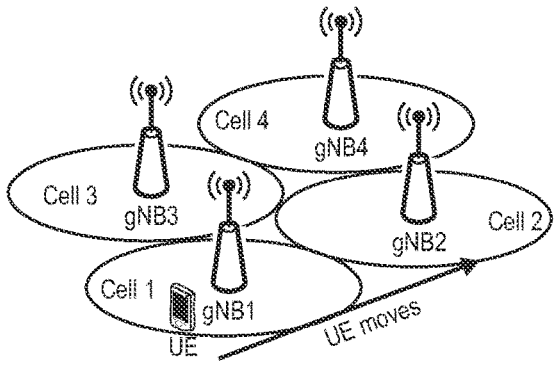
Fig. 11
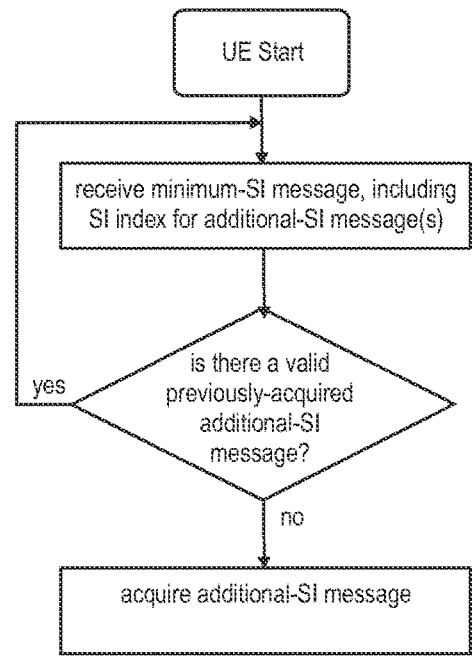
Fig. 12
| SI index | | SI message |
|---|---|---|
| area_pointer_1 | Value_tag_1 | SI1 |
| SI_index_1 | | |
| area_pointer_2 | Value_tag_2 | SI2 |
| SI_index_2 | | |
| area_pointer_3 | Value_tag_3 | SI3 |
| SI_index_3 | | |
| area_pointer_4 | Value_tag_4 | SI4 |
| SI_index_4 | | |
| area_pointer_5 | Value_tag_5 | SI5 |
| SI_index_5 | | |
Fig. 13

| Area pointer | Area type |
|---|---|
| 00 | Tracking area |
| 01 | RAN-based notification area |
| 10 | SI Area |
| 11 | Cell |

| SI index | | SI message |
|---|---|---|
| area pointer (00) | Value_tag_1 | SI1 |
| SI_index_1 | | |
| area pointer (01) | Value_tag_2 | SI2 |
| SI_index_2 | | |
| area pointer (10) | Value_tag_3 | SI3 |
| SI_index_3 | | |
| area pointer (11) | Value_tag_4 | SI4 |
| SI_index_4 | | |
| area pointer (11) | Value_tag_5 | SI5 |
| SI_index_5 | | |
| 2 bits | 8 bits | |

| SI index | | SI message |
|---|---|---|
| area_pointer_1 | Value_tag_1 | SI1 |
| SI_index_1 | | |
| area_pointer_2 | Value_tag_2 | SI2 |
| SI_index_2 | | |
| area_pointer_3 | Value_tag_3 | SI3 |
| SI_index_3 | | |
| area_ID_4 | Value_tag_4 | SI4 |
| SI_index_4 | | |
| area_pointer_5 | Value_tag_5 | SI5 |
| SI_index_5 | | |

Fig. 17

| Area pointer | Area type |
|---|---|
| #1 | Tracking area ID |
| #2 | RAN-based area ID |
| #3 | SI Area ID #1 |
| #4 | SI Area ID #2 |
| #5 | SI Area ID #3 |
| #6 | SI Area ID #4 |

Fig. 18

| SI index | | SI message |
|---|---|---|
| area_pointer_1 | Value_tag_1 | SI1 |
| SI_index_1 | | |
| area_pointer_2 | Value_tag_2 | SI2 |
| SI_index_2 | | |
| area_pointer_3 | Value_tag_3 | SI3 |
| SI_index_3 | | |
| area_pointer_4 | Value_tag_4 | SI4 |
| SI_index_4 | | |
| area_pointer_5 | Value_tag_5 | SI5 |
| SI_index_5 | | |
| 3 bits | 8 bits | |

Fig. 19

USER EQUIPMENT AND BASE STATION PARTICIPATING IN A SYSTEM INFORMATION ACQUISITION PROCEDURE

BACKGROUND

Technical Field

The present disclosure is directed to methods, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT) which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 14.2.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, there has been discussion on how to handle the provision of system information by the network and the respective acquisition of the system information by the UEs. It is important to establish and define effective processes to deliver system information by the base stations and to acquire system information by the UEs.

BRIEF SUMMARY

One non-limiting and exemplary embodiment facilitates providing an improved system information procedure, in which different entities (UE, gNBs) are participating.

In one general aspect, the techniques disclosed here feature a user equipment. The user equipment comprises a receiver which receives a minimum-system-information message from a first radio base station controlling a first radio cell of a mobile communication system. System information for the first radio cell that can be acquired by the user equipment is carried within the minimum-system-information message and one or more additional-system-information messages. The minimum-system-information message includes system information for accessing the first radio cell and includes at least one system information index. Each system information index is associated with one of the additional-system-information messages. The system information message index comprises a value tag and an area pointer, wherein the area pointer points to one area already defined. The user equipment comprises processing circuitry which determines whether the user equipment had already acquired before the additional-system-information message being associated with the same value tag and the same area as indicated by the system information index received in the minimum-system-information message. If the determination is positive, the processing circuitry determines that system information included in said additional-system-information message acquired before is applicable to the first radio cell.

In one general aspect, the techniques disclosed here feature a radio base station. The radio base station comprises processing circuitry which generates a minimum-system-information message including system information for accessing a first radio cell controlled by the radio base station and including at least one system information index. System information for the first radio cell that can be acquired by the user equipment is carried within the minimum-system-information message and one or more additional-system-information messages. Each system information index being associated with one of the additional-system-information messages. The system information message index comprises a value tag and an area pointer. The area pointer pointing to one area already defined. The radio base station comprises a transmitter which transmits the minimum-system-information message to the user equipment.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 10 illustrates the exemplary and simplified structure of a UE and an eNB, FIG. 11 illustrates an exemplary scenario in which a UE, located at the radio cell of gNB1 is moving towards the radio cell 2 controlled by gNB2, FIG. 12 shows the flow chart of an operation performed at the UE for the improved system information acquisition procedure, FIG. 13 illustrates the system information indexes for the corresponding additional-SI messages, each being composed of an area pointer and a value tag, FIG. 17 illustrates the system information indexes for the corresponding additional-SI messages, one of the system information indexes comprising an area ID as well as a value tag while the other system information indexes comprising area point and value text, FIG. 18 illustrates the association between the area pointer and a list of area ID, and FIG. 19 illustrates the system information indexes for the corresponding additional-SI messages, each being composed of an area pointer and a value tag.

DETAILED DESCRIPTION

Basis of the Present Disclosure

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
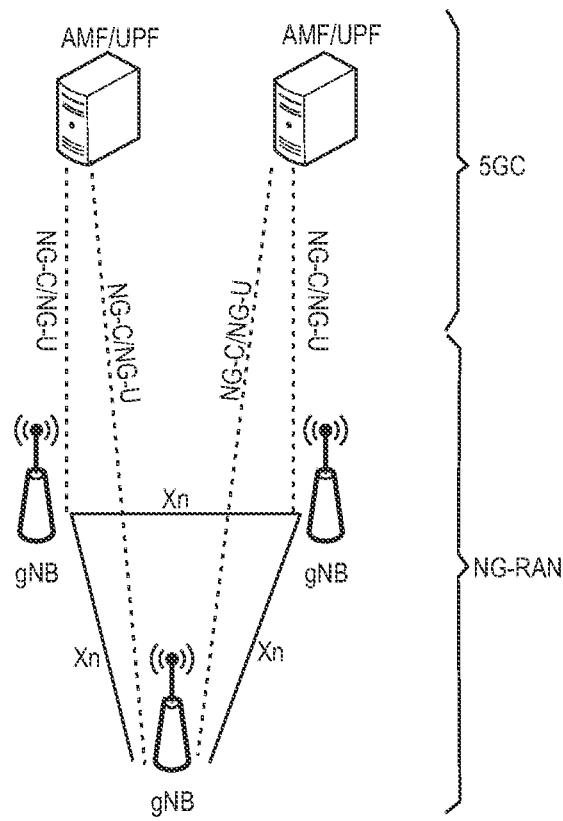
FIG. 1 shows an exemplary architecture for a 3GPP NR system.

Among other things, there has been a provisional agreement on the overall system architecture. The NG-RAN (Next Generation-Radio Access Network) consists of gNBs, providing the NG-Radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the NG-C interface and to the UPF (User Plane Function) by means of the NG-U interface. The NG-RAN architecture is illustrated in FIG. 1, as taken from the TS 38.300 v.0.4.1, section 4 incorporated herein by reference.

Figure 2:
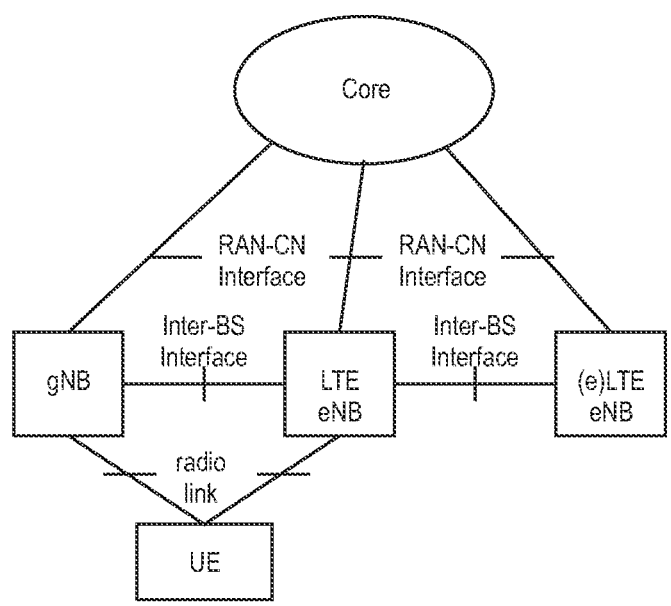
FIG. 2 shows an exemplary user and control plane architecture for the LTE eNB, gNB, and UE.

Various different deployment scenarios are currently being discussed for being supported, as reflected, e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of TR 38.301, while additionally illustrating an LTE eNB as well as a user equipment (UE) that is connected to both a gNB and an LTE eNB (which is to be understood as an eNB according to previous 3GPP standard releases such as for LTE and LTE-A). As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

Figure 3:
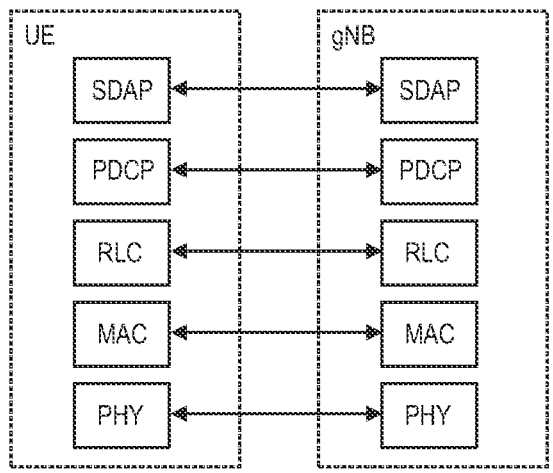
FIG. 3 illustrates the user plane protocol stack for 5G NR.
Figure 4:
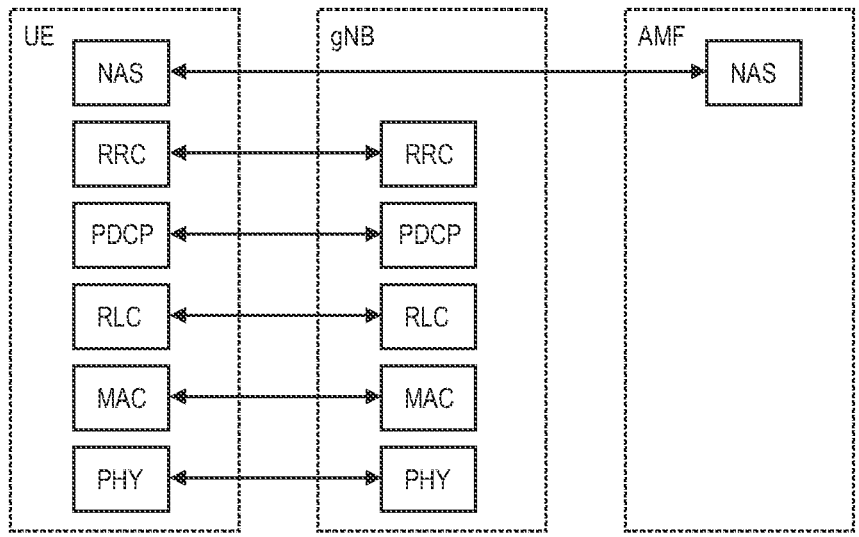
FIG. 4 illustrates the control plane protocol stack for 5G NR.

The user plane protocol stack for NR is illustrated in FIG. 3, as currently defined in TS 38.300 v0.2.0, section 4.4.1. The PDCP, RLC and MAC sublayers are terminated in the gNB on the network side. Additionally, a new access stratum (AS) sublayer (SDAP, Service Data Adaptation Protocol) is introduced above PDCP as described in sub-clause 6.5 of S TS 38.300 v0.2.0. The control plane protocol stack for NR is illustrated in FIG. 4, as defined in TS 38.300, section 4.4.2. An overview of the Layer 2 functions is given in sub-clause 6, of TS 38.300. The functions of the PDCP, RLC and MAC sublayers are listed in sub-clauses 6.4, 6.3, and 6.2 of TS 38.300. The functions of the RRC layer are listed in sub-clause 7 of TS 38.300. The mentioned sub-clauses of TS 38.300 v0.2.0 are incorporated herein by reference.

The new NR layers exemplarily assumed at present for the 5G systems may be based on the user plane layer structure currently used in LTE(-A) communication systems. However, it should be noted that no final agreements have been reached at present for all details of the NR layers.

RRC States

In LTE, the RRC state machine consists of only two states, the RRC idle state which is mainly characterized by high power savings, UE autonomous mobility and no established UE connectivity towards the core network, and the RRC connected state in which the UE can transmit user plane data while mobility is network-controlled to support lossless service continuity.

The RRC in NR 5G as currently defined in section 5.5.2 of TR 38.804 v14.0.0, incorporated herein by reference, supports the following three states, RRC Idle, RRC Inactive, and RRC Connected, and allows the following state transitions as defined in TR 38.804.

As apparent, a new RRC state, inactive, is defined for the new radio technology of 5G 3GPP, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signaling, power saving, latency, etc.

RACH Procedure

No final agreement has been reached with regard to the RACH (Random Access Channel) procedure in 5G NR. As described in section 9.2 of TR 38.804 v14.0.0, incorporated herein by reference, the NR RACH procedure may support both contention-based and contention-free random access, in the same or similar manner as defined for LTE. Also, the design of the NR RACH procedure shall support a flexible message 3 size, similar as in LTE.

Figure 5:
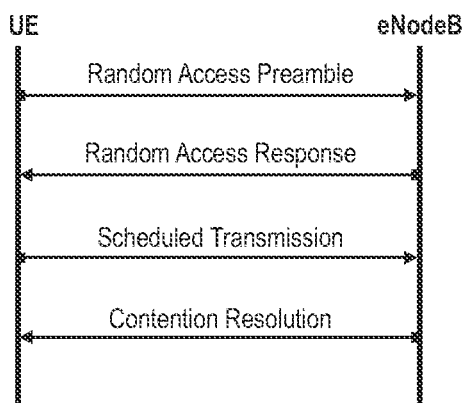
FIG. 5 illustrates the messages exchanged between an eNB and a UE when performing a contention-based RACH procedure.

The LTE RACH procedure will be described in the following in more detail, with reference to FIGS. 5 and 6. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. Essentially the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, i.e., implying an inherent risk of collision, or contention-free (non-contention based). A detailed description of the random access procedure can be also found in 3GPP TS 36.321, section 5.1. v14.1.0 incorporated herein by reference.

In the following the LTE contention based random access procedure is being described in more detail with respect to FIG. 5. This procedure consists of four "steps". First, the user equipment transmits a random access preamble on the Physical Random Access Channel (PRACH) to the eNodeB (i.e., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) which RACH preamble was detected until the RACH procedure is finished, since the "real" identity of the mobile at this point is not yet known by the eNodeB.

The user equipment monitors the PDCCH for reception of the random access response message within a given time window, which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like for example an RRC connection request or a buffer status report.

In case of a preamble collision having occurred in the first of the RACH procedure, i.e., multiple user equipments have sent the same preamble on the same PRACH resource, the colliding user equipments will receive the same T-CRNTI within the random access response and will also collide in the same uplink resources when transmitting their scheduled transmission in the third step of the RACH procedure. In case the scheduled transmission from one user equipment is successfully decoded by eNodeB, the contention remains unsolved for the other user equipment(s). For resolution of this type of contention, the eNode B sends a contention resolution message (a fourth message) addressed to the C-RNTI or Temporary C-RNTI.

Figure 6:
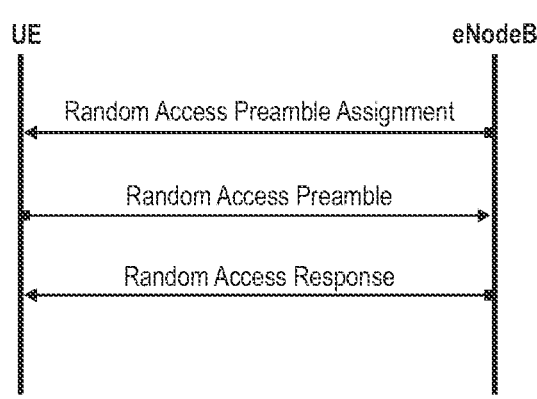
FIG. 6 illustrates the messages exchanged between an eNB and a UE when performing a contention-free RACH procedure.

FIG. 6 is illustrating the contention-free random access procedure of 3GPP LTE, which is simplified in comparison to the contention-based random access procedure. The eNodeB provides in a first step the user equipment with the preamble to use for random access so that there is no risk of collisions, i.e., multiple user equipments transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

Thus, a similar or same RACH procedure as just explained in connection with FIGS. 5 and 6 could be adopted in the future for the new radio technology of 5G. However, 3GPP is also studying a two-step RACH procedure for 5G NR, where a message 1, corresponding to message 4 in the four-step RACH procedure, is transmitted at first. Then, the gNB will respond with a message 2, corresponding to messages 2 and 4 of the LTE RACH procedure. Due to the reduced message exchange, the latency of the two-step procedure may be reduced compared to the four-step procedure. The radio resources for the messages are optionally configured by the network.

LTE Handover Procedure

Mobility is a key procedure in LTE communication system. There are two types of handover procedures in LTE for UEs in active mode: the S1-handover and the X2-handover procedure. For intra-LTE mobility, the handover via the X2 interface is normally used for the inter-eNodeB mobility. Thus, the X2 handover is triggered by default unless there is no X2 interface established or the source eNodeB is configured to use another handover (e.g., the S1-handover) instead.

Figure 7:
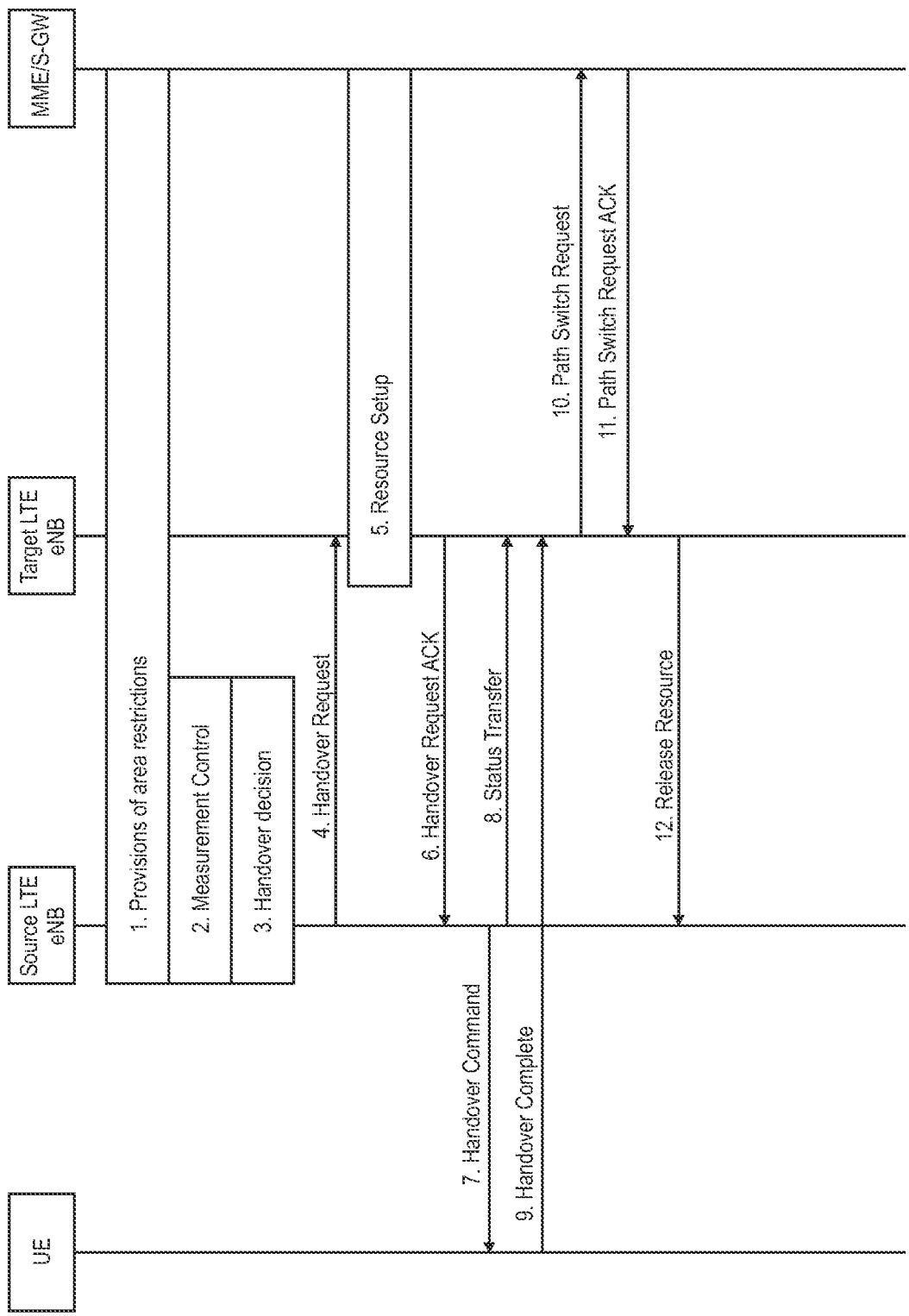
FIG. 7 illustrates an exemplary signaling diagram for a X2 handover procedure of the LTE communication systems.

FIG. 7 gives a brief exemplary and simplified overview of the X2 intra-LTE handover.

The X2 handover comprises a preparation phase (steps 4 to 6), an execution phase (steps 7 to 9) and a completion phase (after step 9). The X2 intra-LTE handover is directly performed between two eNodeBs. Other entities of the core network (e.g., the MME, Mobility Management Entity) are informed only at the end of the handover procedure once the handover is successful, in order to trigger a path switch to the new eNB.

More information on mobility procedures in LTE can be obtained, e.g., from 3GPP TS 36.331 v14.2.2, section 5.4 incorporated herein by reference, and from 3GPP 36.423 v14.2.0 section 8.2 incorporated herein by reference.

LTE—Closed Subscriber Group (CSG)

Closed Subscriber Group identifies a group of subscribers who are permitted to access one or more CSG cells of the PLMN. The cell with CSG Indication set to be 'TRUE' is called 'CSG Cell'. Non-CSG Cell (i.e., an Ordinary Cell) allows any UE to camp on as long as the UE has proper PLMN info and the cell is not barred, but a CSG Cell allows only UEs to camp on that belong to a specific CSG. A Closed Subscriber Group identifies subscribers of an operator who are permitted to access one or more cells of the PLMN but which have restricted access (CSG cells).

To make a CSG call, UE should send CSG Id to which it belongs and its access type in Attach request. MME then performs UE authentication with the HSS and then exchanges Update Location Request and Answer. In Update Location Answer, HSS sends CSG Information (CSG Id, Subscription timer) in Subscription data. MME then verifies the CSG Id with the CSG received in Attach request. If it matches, then UE proceeds the CSG call and sends Create session request with CSG Information IE to SGW. Upon receiving of successful response from SGW, MME sends Attach Accept message with Member status as 'member'. After expiry of the Subscription timer for which UE is subscribed to attach with CSG cell, MME initiate PDN connection deletion.

More detailed information on Closed Subscriber Groups can be found throughout 3GPP TS 36.304 v14.2.0 incorporated herein by reference.

Tracking Area

To reduce the overhead in the E-UTRAN and the processing in the UE, all UE-related information in the access network can be released during long periods of data inactivity. The UE is then in the ECM-IDLE state (EPS Connection Management-IDLE). The MME retains the UE context and the information about the established bearers during these idle periods. To allow the network to contact an ECM-IDLE UE, the UE updates the network as to its new location whenever it moves out of its current Tracking Area (TA); this procedure is called a 'Tracking Area Update'. More specifically, LTE introduced a mechanism of providing individual tracking area sizes for a UE by allowing the core network to provide a list of TAIs (Tracking Area Identities) that is considered the actual tracking area for this UE. When the UE leaves this combined area of the list of TAs (e.g., the UE might receive a Tracking Area ID from a base station, which is not in the list of TAs), the UE triggers a NAS tracking area update (TAU) procedure. The same or a similar approach could be foreseen for supporting mobility of a UE in RRC idle state in the 5G NR. The core network area may be defined differently from the RAN-based notification area, which will presumably be as large or smaller than the core network area.

The MME is responsible for keeping track of the user location while the UE is in ECM-IDLE. When there is a need to deliver downlink data to an ECM-IDLE UE, the MME sends a paging message (core network initiated paging) to all the eNodeBs in the current TA of the UE, and the eNodeBs in turn send paging messages over the radio interface so as to reach the UE.

More detailed information on tracking areas can be found in 3GPP TS 24.301 v14.3.0, incorporated herein by reference, e.g., in sections 5.5.3, 8.2.26-8.2.29, 9.9.32, and 9.9.33

RRC States and RAN-Based Notification Areas

In LTE, the RRC state machine consists of only two states, the RRC idle state which is mainly characterized by high power savings, UE autonomous mobility and no established UE connectivity towards the core network, and the RRC connected state in which the UE can transmit user plane data while mobility is network-controlled to support lossless service continuity.

The RRC in NR 5G as currently defined in section 5.5.2 of TR 38.804 v14.0.0, incorporated herein by reference, supports the following three states, RRC Idle, RRC Inactive, and RRC Connected. As apparent, a new RRC state, inactive, is defined for the new radio technology of 5G 3GPP, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signaling, power saving, latency, etc. The new RRC inactive state shall thus be designed to allow minimizing signaling, power consumption and resources costs in the radio access network and core network while still allowing, e.g., to start data transfer with low delay. The different states are characterized by sub-clause 5.5.2 of TR 38.804 v14.0.0 incorporated herein by reference.

According to one characteristics of the new RRC inactive state, for the UE in RRC inactive the connection (both for user plane and control plane) is maintained with RAN and the core network. In addition, the paging mechanism (may also be called notification mechanism) for user equipments in that cell is based on so called radio access network, RAN-based notification areas (in short RNAs). The radio access network should be aware of the current RNA the user equipment is located in, and the user equipment may assist the gNB to track the UE moving among various RNAs.

A RNA can cover a single or multiple cells. It can be smaller than the core network area, used for tracking a UE in RRC idle state. While the UE in RRC inactive state stays within the boundaries of the current RNA, it may not have to update its location with the RAN (e.g., gNB). Correspondingly however, when leaving its current RNA (e.g., and moving to another RNA), the UE may update its location with the RAN. There is not yet a final agreement on how the RNAs are configured and defined. Sub-clause 5.5.2.1 of TR 38.804 v14.0.0, incorporated herein by reference, mentions several possible options that are currently discussed.

Figure 8:
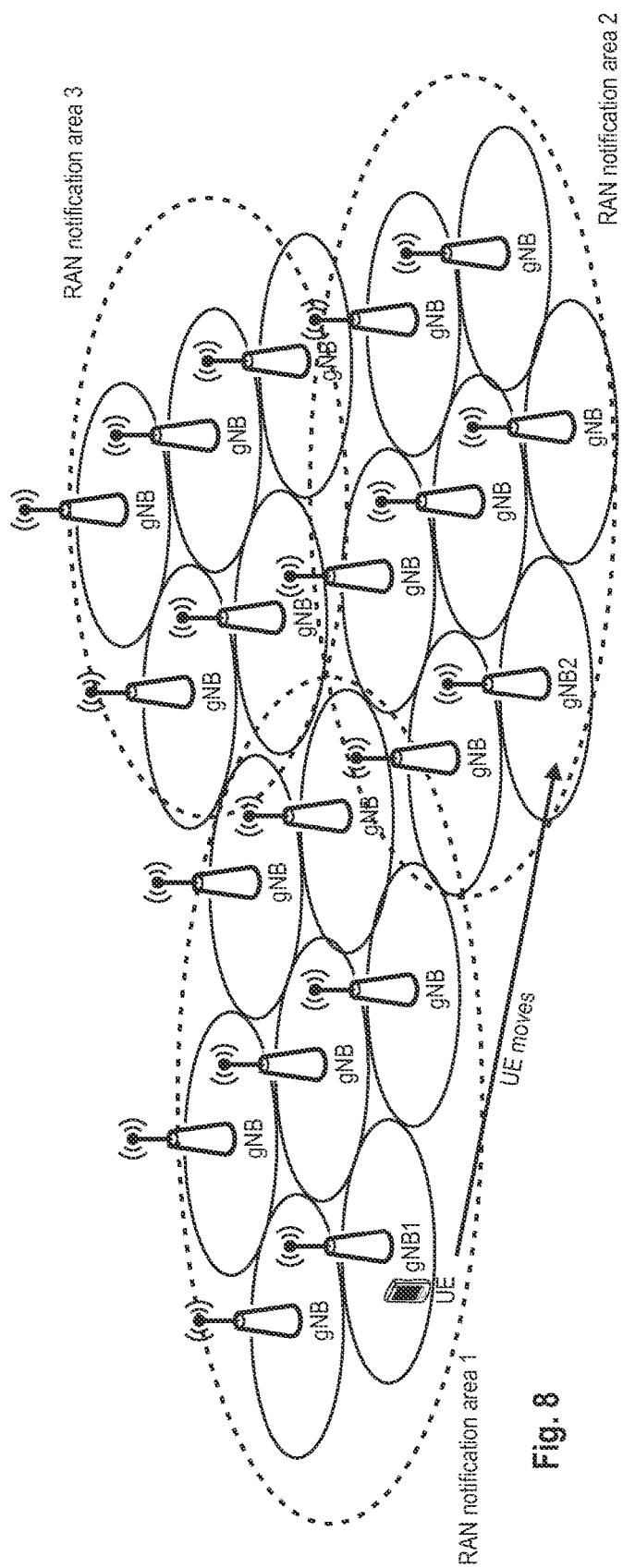
FIG. 8 illustrates three RAN-based notification areas, respectively being composed of several gNBs, as well as a UE connected to gNB1 of area 1.

FIG. 8 illustrates an example scenario where there are several RNAs, respectively composed of several gNB s. The UE is connected to a gNB1 belonging to RNA1 and is assumed to move to gNB2 of RNA2. According to one option, a list of cells constituting the RAN-based notification area is defined. The UE is provided with an explicit list of cells (e.g., via dedicated signaling, i.e., signaling directly addressed to the UE, e.g., an RRC connection reconfiguration message), such that the UE can determine in which current RNA it is based on the current cell. According to another option, RAN areas are each being identified by a RNA ID. Each cell, specifically the gNB, broadcasts (at least one) RNA ID (e.g., in its system information; alternatively or additionally, this information can be transmitted to a UE using dedicated signaling) so that a UE knows to which RAN area the cell belongs. At present, no decision has been made as to whether to support one or both options, or maybe a different solution is agreed upon in the future. Also no details are available about the RNA ID, such as its bit size, etc.

LTE System Information Acquisition

In LTE, system information is structured by means of system information blocks (SIBs), each of which contains a set of functionally related parameters. The MIB (master information block) includes a limited number of the most frequently transmitted parameters which are essential for an initial access of the UE to the network. There are system information blocks of different types SIB1-SIB18 currently defined in LTE to convey further parameters, e.g., SIB1 includes parameters needed to determine if a cell is suitable for cell selection, as well as information about the time domain scheduling of the other SIBs, SIB2 includes common and shared channel information.

Three types of RRC (Radio Resource Control) messages can be used to transfer the system information, the MIB, the SIB1 message and SI messages. SIBs other than SIB1 are transmitted within system information messages (SI messages), of which there are several, and which includes one or more SIB s which have the same scheduling requirements (e.g., the same transmission periodicity). Depending on the content of the SI messages, the UE has to acquire different SI messages in idle and connected states; e.g., $3^{rd}$. SI message, with SIBS (inter-frequency cell reselection information) need to be acquired in idle state only.

The time-domain scheduling of the MIB and SIB1 messages is fixed with periodicities of 40 ms and 80 ms respectively. The time-domain scheduling of the SI messages is dynamically flexible: each SI message is transmitted in a defined periodically-occurring time-domain window while the physical layer control signaling indicates in which subframes within the window the SI is actually being scheduled. The scheduling window of the different SI messages (in short SI window) are consecutive and have a common length that is configurable. SI messages may have different periodicities, such that in some clusters of SI windows (many or) all of the SI messages are scheduled, while in other clusters only the SI messages with shorter repetition periods are transmitted. System information normally changes at specific radio frames and at a specific modification period. LTE provides two mechanisms for indicating that system information has changed. 1. Paging message including a flag indicating whether or not system information has changed, and 2. A value tag in SIB1 which is incremented every time one or more of SI messages change.

If the UE receives a notification of a change of SI, it starts acquiring the system information from the start of the next modification period. Until the UE has successfully acquired the updated system information, it continues to use the existing parameters. If a critical parameter changes, the communication may be seriously affected, but any service interruption that may result is considered acceptable since it is short and infrequent.

More information on the system information can be found in the 3GPP Technical Specification TS 36.331 v14.1.0, section 5.2 "System information" incorporated herein in its entirety by reference.

NR System Information Acquisition

In 5G NR it is currently envisioned (although not finally agreed upon) that the system information is generally divided into a minimum system information and other system information. The minimum system information is periodically broadcast and comprises basic information required for initial access to a cell (such as System Frame Number, SFN, list of PLMN, Cell ID, cell camping parameters, RACH parameters). The minimum system information may further comprise information for acquiring any other SI broadcast periodically or provisioned via on-demand basis, e.g., suitable scheduling information in said respect. The scheduling information may for instance include as necessary the SIB type, validity information, SI periodicity and SI-window information. Correspondingly, the other system information shall encompass everything that is not broadcast in the minimum system information, e.g., cell-reselection neighboring cell information.

Figure 9:
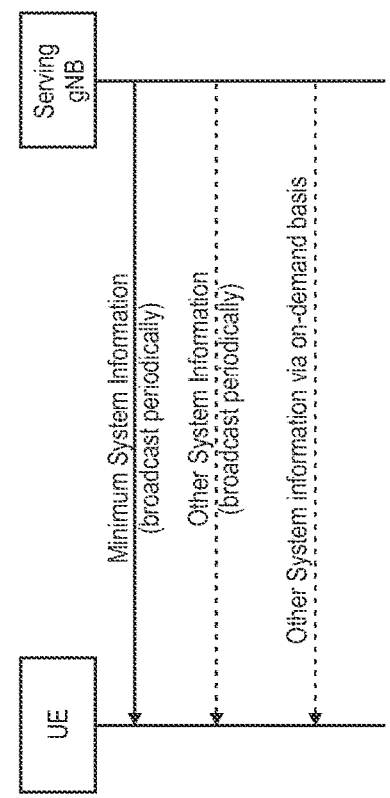
FIG. 9 illustrates the system information acquisition message exchange as currently discussed for 5g NR.

The other SI may either be broadcast, or provisioned in a dedicated manner, either triggered by the network or upon request from the UE, as illustrated in FIG. 9. The other SI can be broadcast at a configurable periodicity and for a certain duration. It is a network decision whether the other SI is broadcast or delivered through dedicated UE-specific RRC signaling.

For the other SI that is actually required by the UE, before the UE sends the other SI request, the UE needs to show whether it is available in the cell and whether it is broadcast or not. For the UE in RRC_CONNECTED state, dedicated RRC signaling can be, e.g., used for the request and delivery of the other SI.

In legacy LTE as briefly explained above, the UE is always required to (re-) acquire system information when cell change occurs and the UE is also required to re-acquire all the system information when the system information is changed (e.g., indicated by paging or an incremented, i.e., changed, value tag). For the new system in 5G NR, it is generally desired to reduce the need to re-acquire system information by identifying stored system information with a specific index/identifier, which is broadcast together with the minimum system information. It is assumed that some system information valid in one cell may be valid also in other cells. For example, the common radio resource configuration, the Access Class barring information, the UL carrier frequency and bandwidth, and the MB SFN (Multimedia Broadcast Single-Frequency Network) subframe configuration may be valid among multiple adjacent cells.

More particularly, the specific index/identifier (which can be exemplarily called system information index) can be used to indicate the validity of associated system information in other cells. This index/identifier can be applicable in more than one cell.

As a result, if the UE already stores valid system information, it is not necessary to re-acquire that previously acquired and valid system information. This allows reducing the UE power consumption and may involve less signaling overhead on the air interface.

The system information index could be a single index or may be divided into two or more items, such as an area identifier and a value tag (same or similar to LTE). The value tag, e.g., could be valid in one cell, while the complete system information index could then be considered valid in more than one cell as mentioned above so as to be able to avoid re-acquisition of system information.

There are no final agreements with regard to what the system information index is, or how it is signaled. Any signaling procedures to be defined for 5G NR should at least provide configuration flexibility for the definition of the system information but should still keep the overhead of the transmission of system information at a minimum.

Another problem which may occur in the new 5G NR system is that for a handover case, it may take a longer time (e.g., compared to LTE) for the UE to obtain all required SI messages from the target eNB, since some system information is not broadcast automatically by gNB s but is only available on demand after the UE sends out a corresponding other SI request (see above).

The present disclosure thus shall present solutions facilitating to overcome one or more of the disadvantages and/or meet one or more of the requirements mentioned above.

Detailed Description of Present Disclosure

In the following, UEs, base stations, and procedures will be described for the new radio access technology envisioned for the 5G mobile communication systems. Different implementations and variants will be explained as well. The following detailed disclosure was facilitated by the discussions and findings as described in the previous section "Basis of the present disclosure" and may be based at least on part thereof.

In general, it should be however noted that only few things have been actually agreed on with regard to the 5G cellular communication system such that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, terms of the procedures, entities, layer layers, etc., used in the following are closely related to LTE/LTE-A systems or to terminology used in the current study items for 3GPP 5G, even though specific terminology to be used in the context of the new radio access technology for the next 3GPP 5G communication systems is not fully decided yet. Thus, terms could be changed in the normative phase, without affecting the functioning of the embodiments of the disclosure. Consequently, a skilled person is aware that the disclosure and its scope of protection should not be restricted to particular terms exemplary used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is e NB (or eNodeB), while the currently-used terminology for 5G NR is gNB.

The term "minimum-system-information message" refers to a particular type of message carrying the minimum system information that is to be broadcast in a radio cell for a UE accessing the radio cell. The "minimum-system-information message" is transmitted periodically in the radio cell, and its content can change. Other terminology used therefor is "minimum SI". Functionally, the "minimum-system-information" is similar to the MIB and/or the SIB1 used in legacy LTE systems.

Further system information for the radio cell can be transmitted using "additional-system-information messages", which is a term referring to particular types of messages carrying system information for the radio cell which is not broadcast within the minimum-system-information message(s). Other terminology used therefor is "other SI". Functionally, the "additional-system-information message" is similar to the SIB s used in legacy LTE systems.

The term "system information index" refers to an information element which is associated with the "additional-system-information message", such that there is a one-to-one relationship between a system information index and the associated "additional-system-information message". It should be noted however that it is not every "additional-system-information message" need be associated with a "system information index". The system information index is to be used in the context of the system information acquisition procedure to determine the validity of the associated "additional-system-information message", as explained in the application, and shall allow the UE to avoid re-acquisition of system information in certain circumstances.

The term "area pointer" refers to an information element being part of the minimum-system-information message and specifically the system information index. The area pointer shall not be understood as by itself providing any information on the area, but shall be understood to be acting as a pointer to additional information so as to allow determining in combination an area (e.g., its type and/or ID). In specific examples the "area pointer" is functionally being used to encode the spatial validity of the additional-system-information message with which the system information index, in which it is included, is associated. In other words, it is assumed that the system information within the additional-SI message (additional-system-information message) is equally applicable (i.e., valid) in several radio cells, and that the validity in those several cells can be encoded into the "area pointer", so as to allow UEs to determine the spatial validity of an additional-SI message based on the area pointer. The validity in time of an additional-SI message is exemplarily encoded using the "value tag".

The term "value tag" refers to an information element being part of the minimum-system-information message and specifically the system information index. The value tag can be functionally used to encode the temporal validity of the additional-system-information message with which the system information index, in which it is included, is associated. In other words, it is assumed that the value tag is changed (e.g., incremented) every time the content of the additional-SI message is changed, so as to allow UEs to determine the temporal validity of an additional-SI message.

FIG. 10 illustrates a general, simplified and exemplary block diagram of a user equipment (also termed communication device) and a scheduling device (here assumed to be located in the base station, e.g., the LTE eNB or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node)

over which the processing circuitry, when in operation, can control the transceiver, i.e., control the receiver and/or the transmitter and exchange reception/transmission data. The transceiver may include the RF (radio frequency) front including one or more antennas, amplifiers, RF modulator/demodulator and the like. The processing circuitry may implement control tasks such a controlling the transceiver to transmit user data and control data provided by the processing circuitry and/or receive user data and control data which is further processed by the processing circuitry. The processing circuitry may also be responsible for performing processes of determining, deciding, calculating, measuring, etc. The transmitter may be responsible for performing the process of transmitting. The receiver may be responsible for performing the process of receiving.

A simple and exemplary scenario is assumed in the following. As illustrated in FIG. 11 it is assumed that a UE is located in the coverage are of radio cell 1 which is controlled by gNB1. One important procedure to be continuously performed by the UE is the system information acquisition procedure. The system information acquisition procedure is, e.g., used to acquire the necessary system information when powering up in the radio cell, when moving within the radio cell, and/or when moving to a new radio cell.

Based on the just discussed preliminary agreements and understanding reached in 3GPP on the system information acquisition procedure for 5G NR, the provision of the overall system information is divided among a minimum-SI message and one or more additional-SI messages that are made available to UEs in the respective radio cell(s). Although no agreements have been reached yet, it is exemplarily assumed that there are five additional-SI messages in total (e.g., termed SI1-SI5); any other suitable number of additional-SI messages is equally possible.

The minimum-SI message is broadcast periodically by gNB1 to be acquired first by the UE. The five additional-SI messages are either broadcast periodically or are available for the UEs in the radio cell on demand (i.e., upon requesting the additional-SI message from gNB1); in either case, the UE is able to acquire the additional-SI messages and the embodiments are equally applicable. The minimum-SI message comprises the minimum system information that is to be broadcast in a radio cell for a UE accessing the radio cell and further comprises the necessary scheduling information to enable the UE to obtain further system information, i.e., by acquiring some or all of the additional-SI messages.

The different additional-SI messages include different types of system information, some or all of which might not be strictly necessary for the operation of the UE. Consequently, the UE may decide for each additional-SI message, whether its system information is even necessary for the operation of the UE in the radio cell. For instance, an additional-SI message for the Earthquake and Tsunami Warning Serving (ETWS) notifications might not be considered necessary for the UE. According to an exemplary embodiment, the UE can exemplarily first determine which of the additional-SI messages announced in the minimum-SI message are even necessary for its operation, before continuing to determine whether acquisition of the required additional-SI messages can be avoided as will be explained in detail in the following. For ease of explanation of the different embodiments and variants thereof, it is exemplary assumed that the UE considers all of the additional-SI messages (here, e.g., SI1-SI5) to be important for its operation and decides in principle to obtain all the corresponding system information therein. Whether the system information will indeed be acquired by the UE, depends on the particular instance to avoid acquisition of same in certain circumstances as will be explained in the following.

As explained before, there has been an agreement in 3GPP that the system information acquisition procedure should be improved so as to avoid reacquisition of system information in certain circumstances. Correspondingly, the following embodiments described herein use a system information index in connection with the additional-SI messages to encode the validity of the associated additional-SI message over time and space (i.e., area), and thus to allow UEs to first determine the validity of the announced additional-SI message vis-à-vis previously acquired additional-SI messages and then to decide whether or not acquisition of that additional SI message is actually necessary.

At least one of the additional-SI messages can be associated with the system information index, in which case the minimum-SI message would comprise at least for one of the five additional-SI messages (e.g., SI1) a system information index that is associated with that additional-SI message (i.e., SI1). For the following explanations and in order to provide the most benefit, in one exemplarily embodiment the concept of using a system information index to encode the validity of system information is applied to all five additional-SI messages. Consequently, the minimum-SI message includes a system information index for each of the five existing additional-SI messages that can be acquired by the UE in radio cell 1.

Embodiments described herein pertain to a system information acquisition procedure performed between the UE and a gNB. The embodiments focus on improving the way the validity of system information can be encoded and decoded (respectively by a gNB and the UE) so as be able to avoid (re-)acquisition of system information (i.e., within the additional-SI messages) as well as to reduce overhead for the transmission of the system information and maintain flexibility in defining the validity of system information over space (different areas/cells).

According to some exemplary embodiments, each of the system information indexes is assumed to be composed of a value tag and an area pointer both of which can be differentiated by the UE so as to be processed separately from one another. The area pointer in the system information index, instead of directly including information on a specific area, rather "points" to an area that is already defined (the area may be network specific, but the user equipment should be aware of said area). The UE should be able to interpret the area pointer, i.e., to determine correctly to which area the area pointer in the system information index is actually pointing. In said respect, the UE and the gNB should have a common understanding on how to decode respectively encode an area into the area pointer. The UE and gNB1, e.g., can store a list associating possible values of the area pointer with corresponding areas that are already defined.

On the basis of the area pointer and the stored area list, the UE, upon receiving the system information index including the area pointer, can determine for which area the announced additional-SI message is deemed to be valid.

The value tag, as will be explained in more detailed embodiments later, can be used to determine the temporal validity of the announced additional-SI message.

The UE then needs to determine whether it is necessary to acquire any of the announced additional-SI messages from gNB1. In order to be able to avoid acquisition of any of the additional-SI messages that are acquired before, the UE should have already received before the same additional-SI message with the same value tag and being associated with the same area. In that case, the system information included in said previously acquired additional-SI message can be considered to be still applicable to the present radio cell (within the same area), and there is no need for the UE to again acquire the corresponding additional-SI message comprising the same system information.

On the other hand, in case the value tag and/or the area (indicated by the area pointer) of an additional-SI message as announced in the system information index of the minimum-SI message are different from a corresponding value tag and/or a corresponding area associated with the corresponding previously acquired additional-SI message, then the UE determines that the system information included in that previously acquired additional-SI message is not applicable in the radio cell. Thus, the UE determines that the UE needs to acquire the announced additional-SI message from the gNB so as to obtain valid system information that is applicable to the present radio cell.

Consequently, since the area pointer merely points to an area instead of providing direct identification information for the area, the size of the area pointer can be smaller than a system information index directly identifying the area. Thus, less overhead is generated than compared to a system information index which directly includes an area identification.

The above described improved SI acquisition procedure also allows the gNB1 to flexibly determine the validity area of system information for each additional-SI message separately, since a separate area pointer (which can be set differently from one another) is available in the minimum-SI message for each additional SI message.

FIG. 12 exemplarily illustrates a flow diagram for operating of a UE, particularly with regard to a basic system acquisition procedure as explained above. The functioning of the above described improved SI acquisition procedure is described now in detail based on the following exemplary two scenarios, described in connection with FIGS. 11 to 13. In a first scenario it is exemplarily assumed that the UE is powering up in radio cell 1 of gNB1 and wants to access the radio cell 1 of gNB1 (then to be its serving gNB). gNB1 is broadcasting a minimum-SI message periodically, and the UE acquires same. The minimum-SI message includes system information required for the UE for the initial access to the radio cell 1 and includes information on how to acquire additional-SI messages SI1-SI5 and the content thereof. Thus, among other things the minimum-SI message comprises for each additional-SI message a corresponding system information index, in turn including a particular value tag and area pointer. This is exemplarily illustrated in FIG. 13, which shows five system information indexes (SI_index_1-5) for the five available additional-SI messages SI1-SI5. For instance, SI_index_1, which is associated with additional-SI message SI1, comprises an area_pointer_1 and value_tag_1; SI_index_2, which is associated with additional-SI message S12, comprises an area_pointer_2 and value_tag_2; and so on.

Considering that the UE is powering up for the first time, no additional-SI messages have been acquired before at all and thus no system information is available with regard to the announced additional-SI messages. The UE thus determines for each additional-SI message that it needs to acquire same in order to obtain the corresponding system information contained therein. The UE can thus proceed to acquire the additional-SI messages SI1 up to SI5, as indicated in the minimum SI message; for instance, by receiving those additional-SI messages broadcast by gNB1 at specific periodically occurring radio resources and/or by first requesting and then receiving those additional-SI messages that are only available in the radio cell 1 on demand. Upon receiving the additional-SI messages, the UE may for each additional-SI message store the area and value tag, derived from the system information index associated with the additional-SI message. For instance, for additional-SI message SI1, the UE will store value_tag_1 and information on the area pointed out by the area pointer area_pointer_1 (e.g., the area ID and/or the type of the identified area). The same or similar information can be stored by the UE for the other additional-SI messages SI2-SI5. The UE thus stores validity information for each additional-SI message, which can be used in subsequent system information acquisition procedures.

Now it is assumed that the UE keeps moving within the radio cell 1 and eventually moves to a different radio cell 2 controlled by gNB2 (see FIG. 11). The UE will receive further minimum-SI messages within radio cell 1 and also upon entering the coverage area of radio cell 2. The above-described SI acquisition procedure can be repeatedly performed by the UE, e.g., each time a minimum-SI message is received.

For instance, gNB2 broadcasts a minimum-SI message, which includes system information required for a UE to make an initial access to radio cell 2 and further includes a system information index for each of the additional-SI messages SI1-SI5. The structure of the system information index shall be the same as explained above for the minimum-SI message broadcast by gNB1 and thus is composed of a value tag and an area pointer. The UE then determines whether it is necessary to acquire any of the announced additional-SI messages from gNB2. As explained before, the UE already acquired all of the additional-SI messages from gNB1, however has to determine whether these are also applicable in the new radio cell 2. This determination is performed by the UE based on the content of the system information index and the stored value tags and area information. For each additional-SI message (e.g., SI1), the UE checks the validity of the previously acquired additional-SI message (e.g., SI1) in radio cell 2 by comparing the value tag (e.g., value_tag_1) stored for the previously-acquired additional-SI message (e.g., SI1) with the value tag (value_tag_1) included in the system information index (SI_index_1) for the announced additional-SI message (SI1) in the newly received minimum-SI message. Furthermore, the UE checks the validity of the previously acquired additional-SI message (e.g., SI1) in radio cell 2 by comparing the area stored for the previously-acquired additional-SI message (e.g., SI1) with the area pointed out by the area pointer (area_pointer_1) included in the system information index (SI_index_1) for the announced additional-SI message (SI1) in the newly received minimum-SI message. If both the value tag and the area as announced in the new minimum-SI message are the same as the value tag and the area stored for the previously acquired additional-SI message (e.g., SI1), the corresponding system information included in that previously acquired additional-SI message (SI1) is also applicable in radio cell 2 and the UE does not have to acquire the additional-SI message via radio cell 2. This determination can be performed for each additional-SI message. The sequence of checking the validity of the value tags and checking the validity of the area information is not restricted; i.e., the spatial validity can be checked before the temporal validity, or vice versa, or in parallel.

Although the above scenario exemplarily assumed that the UE moved to a new radio cell 2, the improved system acquisition procedure can also be performed by a UE staying within a cell. For instance, it can be exemplarily assumed that the spatial validity of system information will be maintained as long as the UE stays in the same radio cell. Correspondingly, the area pointer broadcast in the system information index for the additional-SI messages will still point to the same area as before. However, gNB1 might decide to change some system information parameters in one or more of the additional-SI messages (e.g., in SI1). Accordingly, gNB1 will also change the value of the corresponding value tag (e.g., value_tag_1, e.g., incrementing same by 1) and will broadcast the changed value tag value in association with the changed additional-SI message in the minimum-SI message. The UE, determining that the value tag value for an additional-SI message has changed, derives therefrom that the corresponding system information acquired through the previous additional-SI message is no longer valid and will determine to re-acquire the corresponding additional SI message (e.g., SI1) in radio cell 1 as transmitted by gNB1.

In the above, it has been assumed that the area pointer points to an area already defined before. There may be various areas that can be used in said respect. In general, it should be noted that typically one or more areas are already defined with regard to other UE procedures. For instance, one or more tracking areas can be defined, so as to control the network-based mobility, as explained before. In addition, a RAN-based notification area can be defined, in order to implement the paging mechanism when the UE is in the new RRC inactive state, as explained before. Another example is a closed subscriber group area being composed of radio cells to which only particular UEs have access, as explained in more detail before.

Instead of using another area type to define the valid area of system information (i.e., the area with a plurality of gNBs in which part of the system information is equally applicable), a new area type can be defined for said purposes. Thus, a still further area that can be used is a system information area, which is to be generally understood as being an area of a plurality of radio cells in which at least some of the system information is equally applicable. In other words, within one system information area, the radio cells use the same system information parameters out of one or more additional-SI messages, and thus transmit the same system information in its respective radio cell. No agreements in 3GPP have been reached in said respect as to whether and, if so, how system information areas are defined, set up and maintained, etc.

The above explanation has focused on the procedures to be performed primarily at the UE-side. However, the gNB also participates in the improved system information acquisition procedure described above, by performing the corresponding steps to provide the UE with the minimum-SI message, the additional-SI messages. The gNB has to be able to generate the content of the minimum-SI message particularly the system information indexes to be associated with the additional-SI messages as discussed above and in the following.

Furthermore, since particular system information (of one or more additional-SI messages) shall be equally applicable in several radio cells of a specific area (such as a tracking area, or a CSG area, or a RAN-based notification area, or simply a system information area), the gNBs within these areas have to coordinate the system information of the additional-SI messages as well as the system information indexes they broadcast within the minimum-SI message. For example, if system information of one additional-SI message is changed, all gNBs belonging to the validity area of that one additional-SI message have to be synchronized such that the same changed additional-SI message is transmitted and such that the same updated system information index (e.g., updated value tag) is broadcast in the minimum-SI message.

Figures 14, 15, 16:
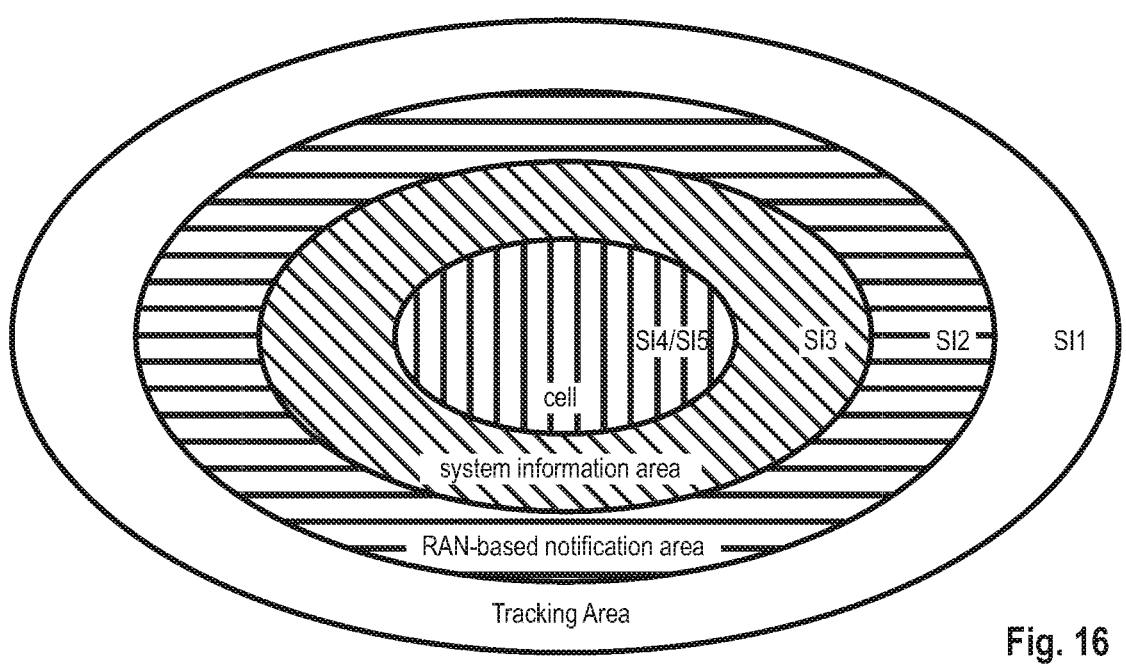
FIG. 14 illustrates the association between the area pointer and the area type
FIG. 15 illustrates an exemplary implementation for the system information indexes already illustrated in FIG. 13.
FIG. 16 illustrates an exemplary definition of different area types and different system information validity areas for different additional-SI messages.

In the following an exemplary embodiment will be described according to which the area pointer of the system information index encodes an area type, based on which the UE is then in the position to determine the corresponding area to which it points. It is exemplarily assumed that the area pointer is 2 bits long, thus being able to encode at most four different types of areas. An exemplary association between different values of the area pointer and the corresponding area types is illustrated in FIG. 14 in form of an area type list with different items, where 00 encodes a tracking area type, 01 encodes a RAN-based area type, 10 encodes an SI area type, and 11 encodes a cell type. It can be assumed that the information of this association is stored by the UE, as well as in the gNB, so as to be able to encode and correctly decode the area pointer information.

The system information index as illustrated in FIG. 13 is then composed of the value tag, which could be, e.g., 8 bits long, and the area pointer having 2 bits. Thus, each system information index is 10 bits, and the additional information carried by the minimum-SI message is 50 bits (10 bits for each of the five additional-SI messages for which the system information index is included).

Correspondingly, the UE determines the area type based on the area pointer and the above mentioned area type association. Then, the UE may determine the actual area (e.g., the identification of the area) based on the identified area type and by using identification information previously acquired for the respective type of area. For instance, exemplarily assuming that the area pointer points to a tracking area type (i.e., 00 in the example of FIG. 14), the UE is aware about the ID (or IDs) of the tracking area and may thus make the appropriate association between the tracking area type and the tracking area identification(s). The UE thus first determines that an announced additional-SI message is associated with a tracking area type so as to then determine the current tracking area ID (as broadcast by gNB1). Then, following the improved system information acquisition procedure as explained above, if that additional-SI message was already acquired before and is valid for the same tracking area as the one announced in the current minimum-SI message, there is no need for the UE to reacquire that additional-SI message.

Put into different words, when the UE moves to a target cell which belongs to same tracking area as the source cell, the additional-SI messages that the UE acquired in the source cell are equally applicable in the target cell and re-acquisition of same can be avoided.

A similar approach is foreseen when the area pointer points to any of the other possible area types, e.g., the RAN-based notification area, the CSG area, or the system information area. In each case, the UE determines the area ID based on the area pointer, the above mentioned area type association and finally the area ID for said identified area type. The IDs of the RAN-based notification area, the CSG area and the system information area are known to the UE beforehand, e.g., broadcast by the gNB or provided to the UE in dedicated signaling.

Based on the thus determined area ID, the UE can determine whether system information previously-acquired in an additional-SI message is also applicable in the current circumstances (e.g., in the new cell). Put briefly, if the target cell belongs to the same area (be it RAN-based notification area, CSG area, or system information area) as the source cell, the additional-SI messages that the UE acquired in the source cell are equally applicable in the target cell and re-acquisition of same can be avoided.

In an exemplary scenario, the different types of areas will be explained in connection with FIGS. 14, 15 and 16. As exemplarily assumed, the same additional-SI message SI1 (specifically the system information contained therein) is applicable within one tracking area; the same additional-SI message SI2 (specifically the system information contained therein) is applicable within one RAN-based notification; the same additional-SI message SI3 (specifically the system information contained therein) is applicable within one system information area; and, the same additional-SI messages SI4/SI5 (specifically the system information contained therein) are applicable within one cell only. FIG. 15 illustrates the values of the corresponding area pointers to reflect the described scenario.

Correspondingly, for SI1, if the new cell and the old cell have the same Tracking Area ID (and also the same value in the value_tag_1), system information contained in the additional-SI message SI1 acquired in the old cell can be used by the UE in the new cell as well. For SI2, if the new cell and the old cell have the same RAN-based notification area ID (and also the same value in the value_tag_2), system information contained in the additional-SI message SI2 acquired in the old cell can be used by the UE in the new cell as well. For SI3, if the new cell and the old cell have the same system information area ID (and also the same value in the value_tag_3), system information contained in the additional-SI message SI3 acquired in the old cell can be used by the UE in the new cell as well. On the other hand, the system information in additional-SI messages SI4 and SI5 is cell specific (area pointer 11), and thus the UE has to acquire additional-SI messages SI4 and SI5 in any case when entering the new cell.

According to a further exemplary embodiment, flexibility shall be further increased on how the spatial validity is encoded into the system information index of an additional-SI message. In the above embodiments, the valid area for system information is encoded into the area pointer field of the system information index, allowing the UE to first determine the area type and then the area ID. However, this solution requires that the UE is able to determine the area ID from simply the area type, which could, e.g., require that the area ID is already known to the UE beforehand (e.g., being broadcast in the radio cell). The following exemplary embodiment facilitates having the advantage that no previous knowledge of an area ID is necessary, since the area ID is directly encoded into the system information index of an additional-SI message.

FIG. 17 illustrates an exemplary configuration of the system information indexes for the five additional-SI messages. As apparent therefrom, it is assumed that the system information index for additional-SI message SI4 includes the area ID itself (e.g., a system information area ID having 8 bits) rather than an area pointer as the system information indexes for the other additional-SI messages. The UE is correspondingly able to determine the area ID from an area pointer as explained above, but is also able to process a system information index including directly the area ID as illustrated in FIG. 17.

One exemplary way such that the UE knows whether a system information index includes an area pointer field (of, e.g., 2 bits) or an area ID (of, e.g., 8 bits) is the use of the ASN.1 coding. For the area pointer field of each system information index, suitable ASN.1 coding allows to differentiate and choose between the different fields, area pointer field and area ID field. An exemplary ASN.1 coding can be as follows:

```
Area_Pointer        CHOICE {
area-pointer              INTEGER (0 .. 3),
-- 0: refer to the Tracking Area type
-- 1: refer to the RAN Area type
-- 2: refer to the SI area type
-- 3: cell type
si-area-ID                INTEGER (0 .. 255)
}
```

In the following an exemplary embodiment will be described according to which the area pointer of the system information index encodes an area list item of an area list with area identifications. An exemplary list of area IDs is illustrated in FIG. 18, and the corresponding system information indexes for the five additional-SI messages are illustrated in FIG. 19. As apparent therefrom, each system information index has the field area pointer which value points to a list item of the area ID list of FIG. 18. It is exemplarily assumed that 3 bits are used for the area list pointer field in the system information index, thus allowing distinguishing up to 8 different area IDs (the actual area list size can be dynamic, with a maximum of list items of 8). It is assumed that the UE has acquired the area ID list so as to be able to decode the area pointer of the system information index. One exemplary option is that that the area list is transmitted in the minimum-SI message as well, in which case the minimum-SI message carries both all system information indexes as well as the area list. Another exemplary option is that the area list is already obtained from a previous cell, e.g., during the handover procedure as will be explained in more detail in later embodiments.

Exemplary assuming 3 bits for the area list pointer and 8 bits for the value tag, 55 bits are necessary to transport the system information indexes for all additional-SI messages. Additionally, the size of the area list depends on its length (i.e., on the number of list items), where 8 bits per list item can be exemplarily assumed, i.e., 8 bits for the ID; e.g., ASN.1 Code allows the UE to distinguish between the different list items. Optionally, 3 bits can be foreseen in the area list for the list item field.

This solution is particularly useful if only few different areas are used for the spatial validity of the system information. When multiple additional-SI messages are associated with the same area (e.g., the same SI area), one list item with the ID of that SI area suffices in the list, such that the area list carried in the minimum-SI message does not get large. Also, in case a cell has multiple area IDs (e.g., tracking area IDs or RAN-based notification area IDs), the discussed solution allows the gNB to unambiguously identify the area ID.

According to further embodiments which can be used independently (e.g., may be combined or used stand-alone) from the above discussed embodiments, the system information acquisition procedure in connection with the handover procedure should be improved. As explained before, some additional-SI messages are only available on demand, i.e., upon explicit request of the UE at the gNB. When performing a handover procedure from a source cell to a target cell in line with the exemplary handover illustrated in FIG. 7, the UE reads the minimum-SI message of the target cell after the handover is completed, e.g., after step 9 of FIG. 7. It is only then that the UE can determine which additional-SI messages should be acquired in the new target cell, e.g., following the improved system information acquisition procedure explained above for one of the various embodiments. This is however time-consuming and involves many transactions between the entities.

According to these further embodiments, the handover procedure should be improved in order to allow the UE to acquire the on-demand additional-SI messages earlier.

According to one of these embodiments, during the handover preparation phase the target gNB transmits the system information index broadcast by the target gNB in its minimum-SI message to the source gNB, e.g., in the Handover Request ACK message (see step 6 of FIG. 7). The source gNB in turn can provide the target-cell-related system information indexes of additional-SI messages to the UE during the handover procedure, e.g., as part of the handover command message. The UE, using the target-cell-related system information indexes, can determine which of the additional-SI messages available on demand in the target cell it would like to acquire. Therefore, the UE already knows before the handover is complete which additional-SI messages it would like to acquire, and can transmit the corresponding additional-SI message request at an earlier point in time. For instance, the UE can transmit the additional-SI message request during the handover execution phase, e.g., when performing the random access channel procedure with the target gNB (the RACH procedure between UE and target gNB can be performed by the UE after receiving the handover command message from the source gNB. In said respect, one of the messages of the RACH procedure can be used by the UE, e.g., using the Random Access Preamble transmission of the contention-free RACH procedure (see FIG. 6). A further subsequent message of the RACH procedure in the handover scenario (not illustrated in FIG. 6; similar to the third message in the contention-based RACH procedure) can carry the RRC Connection Reconfiguration Complete message, termed in FIG. 7 Handover Complete message.

The target-cell additional-SI message requested by the UE can be delivered to the UE, e.g., in a message of the RACH Procedure (e.g., the Random Access Respone message of the contention-free RACH procedure, subsequent to having received the additional-SI request in the first message). Alternatively, the target gNB may use a different dedicated message to provide the UE with the requested additional-SI message, subsequent to having received the additional-SI request in the RRC Connection Reconfiguration Complete message.

In an alternative embodiment, the UE itself is not required to request the on-demand additional-SI messages from the target cell, but this is done by the source gNB during the handover preparation. In particular, the source gNB is informed by the UE on which additional-SI messages the UE would like to receive, e.g., through the measurement report message (see step 2 of FIG. 7),In turn, the source gNB requests these additional-SI messages from the target gNB, e.g., during the handover preparation procedure (e.g., in the Handover Request message, see step 4 of FIG. 7). Similar to the previous alternative, the target gNB can then deliver the target-cell additional-SI message requested by the UE to the UE, e.g., in a message of the RACH Procedure (e.g., the Random Access Response message of the contention-free RACH procedure). Alternatively, the target gNB may use a different dedicated message to provide the UE with the requested additional-SI message.

Further Aspects

According to a first aspect, a user equipment is provided. The user equipment comprises a receiver which receives a minimum-system-information message from a first radio base station controlling a first radio cell of a mobile communication system. System information for the first radio cell that can be acquired by the user equipment is carried within the minimum-system-information message and one or more additional-system-information messages. The minimum-system-information message includes system information for accessing the first radio cell and includes at least one system information index. Each system information index is associated with one of the additional-system-information messages. The system information message index comprises a value tag and an area pointer, wherein the area pointer points to one area already defined. The user equipment comprises processing circuitry which determines whether the user equipment had already acquired before the additional-system-information message being associated with the same value tag and the same area as indicated by the system information index received in the minimum-system-information message. If the determination is positive, the processing circuitry determines that system information included in said additional-system-information message acquired before is applicable to the first radio cell.

According to a second aspect provided in addition to the first aspect, if the determination is negative, the processing circuitry determines that system information included in said additional-system-information message acquired before is not applicable to the first radio cell, and determines to acquire the additional-system-information message for the first radio cell from the first radio base station.

According to a third aspect which is provided in addition to the first or second aspect, an area type list is stored in the user equipment, wherein each item in the area type list is associated with a list number and an area type, wherein the area pointer indicates a list number of the area type list. The processing circuitry, when in operation, determines the area type based on the area pointer and the area type list and determines an area identification based on the determined area type and a previously acquired area identification for said determined area type. Optionally, the processing circuitry, when in operation, determines whether the additional-system-information message acquired before is applicable for the same area based on the determined area type and determined area identification.

According to a fourth aspect provided in addition to the third aspect, the area type is one of the following: a tracking area, a radio access network, RAN-based notification area, a closed subscriber group area, a radio cell, a system information area.

According to a fifth aspect provided in addition to the third or fourth aspect, the receiver, when in operation, receives a second minimum-system-information message from the first radio base station of the first radio cell. The second minimum-system-information message includes system information for accessing the first radio cell and includes one extended system information index. The extended system information index is associated with one of the additional-system-information messages. The extended system information index comprises a value tag and an identification of a system information area. The processing circuitry, when in operation, determines whether the user equipment had already acquired before the additional-system-information message being associated with the same value tag and the same system information area as included in the extended system information index. If said determination is positive, the processing circuitry, when in operation, determines that system information included in said additional-system-information message acquired before is applicable to the first radio cell.

According to a sixth aspect provided in addition to the first or second aspect, the user equipment acquires an area list with corresponding area identifications. Each item in the area list is associated with a list number and an area identification, wherein the area pointer indicates a list number of the area list. The processing circuitry, when in operation, determines the area identification based on the area pointer and the area list. Optionally, the user equipment acquires the area list from the received minimum-system-information message. Optionally, the processing circuitry, when in operation, determines whether the additional-system-information message acquired before is applicable for the same area based on the determined area identification.

According to a seventh aspect provided in addition to one of the first to sixth aspects, the minimum-system-information message comprises one system information index per additional-system information-message that can be acquired by the user equipment in the first radio cell.

According to an eighth aspect provided in addition to any of the first to seventh aspects, one or more of the additional-system-information messages can be broadcast by the first radio base station in the first radio cell, or can be acquired by the user equipment upon requesting same from the first radio base station.

According to a ninth aspect provided in addition to one of the first to the eighth aspects, the processing circuitry, when in operation, stores the received value tag of the system information index and information on the area indicated by the system information index in association with the associated additional-system-information message. Optionally, the stored information on the area comprises information on the type of the indicated area and on the identification of the indicated area.

According to a tenth aspect provided in addition to one of the first to ninth aspects, the receiver, when in operation, receives a second minimum-system-information message from the first radio base station of the first radio cell. The second minimum-system-information message includes system information for accessing the first radio cell and includes a second system information index. The second system information index is associated with an additional-system-information message that the user equipment has already acquired before. The processing circuitry, when in operation, determines that content of the previously acquired system information message has changed when determining that the value of the value tag associated with the previously acquired additional-system-information message is different from the value of a value tag included in the second system information index of the minimum-system-information message. The processing circuitry, when in operation, determines to re-acquire the additional-system-information message when determining that the content of the previously acquired additional-system-information message has changed.

According to an eleventh aspect provided in addition to one of the first to tenth aspects, the system information message already acquired before was received by the receiver of the user equipment when the user equipment was located in a different radio cell or in the first radio cell.

According to a twelfth aspect provided in addition to any of the first to eleventh aspects, the user equipment is moving to a second radio cell under control of a second radio base station. The receiver, when in operation, receives from the first radio base station at least one system information index associated with one additional-system-information message that the user equipment is able to acquire in the second radio cell upon requesting same. A transmitter of the UE, when in operation, transmits to the second radio base station a request for acquiring the one additional-system-information message indicated in the system information index that is associated with the second radio cell. Optionally, the request is transmitted by the transmitter in a message of a random access channel procedure performed between the user equipment and the second radio base station when moving to the second radio base station. Optionally, the receiver, when in operation, receives from the second radio base station the requested additional-system-information message in a message of the random access channel procedure, subsequent to the message used for transmitting the request.

According to a thirteenth aspect provided in addition to any of the first to eleventh aspects, the user equipment is moving to a second radio cell under control of a second radio base station. At least one additional-system-information message that the user equipment is able to acquire in the second radio cell is available upon requesting same. The receiver, when in operation, receives the additional-system-information message from the second radio base station in a message of the random access channel procedure.

According to a fourteenth aspect, a radio base station is provided. The radio base station comprises processing circuitry which generates a minimum-system-information message including system information for accessing a first radio cell controlled by the radio base station and including at least one system information index. System information for the first radio cell that can be acquired by the user equipment is carried within the minimum-system-information message and one or more additional-system-information messages. Each system information index being associated with one of the additional-system-information messages. The system information message index comprises a value tag and an area pointer. The area pointer pointing to one area already defined. The radio base station comprises a transmitter which transmits the minimum-system-information message to the user equipment.

According to a fifteenth aspect provided in addition to the fourteenth aspect, the transmitter, when in operation, transmits one or more of the additional-system-information messages to the user equipment. Optionally, the processing circuitry, when in operation, determines the value of the area pointer of the system information index to indicate an area in which the associated additional-system-information message is applicable.

According to a sixteenth aspect provided in addition with the fourteenth or fifteenth aspect, the area pointer indicates a list number of an area type list, wherein each item in the area type list is associated with a list number and an area type. The processing circuitry, when in operation, determines the list number associated with the area type for which the additional-system-information message is applicable, and sets the area pointer in the system information index for that additional-system-information message to indicate the determined list number. Optionally, wherein the area type is one of the following: a tracking area, a radio access network, RAN-based notification area, a closed subscriber group area, a radio cell, a system information area.

According to a seventeenth aspect provided in addition to any of the fourteenth to sixteenth aspects, the processing circuitry, when in operation, generates a system information index to be associated with one additional-system-information message to include a value tag and an identification of a system information area.

According to a eighteenth aspect provided in addition to the fourteenth or fifteenth aspect, the area pointer indicates a list number of the area list, each item of the area list being associated with a list number and an area identification. The processing circuitry, when in operation, determines the list number associated with the area identification for which the additional-system-information is applicable and sets the area pointer in the system information index for that additional-system-information message to indicate the determined list number. Optionally, wherein the processing circuitry, when in operation, generates the minimum-system-information message to include the area list.

According to a nineteenth aspect provided in addition to any of the fourteenth to eighteenth aspects, the user equipment is moving to a second radio cell under control of a second radio base station. The radio base station comprises a receiver, which in operation, receives from the second radio base station at least one system information index associated with one additional-system-information message that the user equipment is able to acquire in the second radio cell upon requesting same. The transmitter, when in operation, transmits the received at least one system information index relating to the second radio cell to the user equipment. The receiver, when in operation, receives from the user equipment a request for acquiring the one additional-system-information message indicated in the system information index that is associated with the second radio cell. Optionally, the request is received by the receiver in a message of a random access channel procedure performed between the user equipment and the second radio base station when moving to the second radio base station.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a radio base station, the integrated circuit comprising:
processing circuitry, which, in operation, generates a minimum-system-information message including first system information for a user equipment to access a first radio cell controlled by the radio base station and including at least one system information index,
wherein second system information for the first radio cell that can be acquired by the user equipment is carried within one or more additional-system-information messages, each of the at least one system information index is associated with one of the one or more additional-system-information messages, and the system information index comprises a value tag and an area pointer, the area pointer pointing to a defined area, and
transmitting circuitry, which, in operation, transmits the minimum-system-information message to the user equipment,
wherein the minimum-system-information message comprises one system information index per additional-system information message.

2. The integrated circuit according to claim 1, wherein the transmitting circuitry, in operation, transmits the one or more of the additional-system-information messages to the user equipment, and
the processing circuitry, in operation, sets the area pointer of the system information index to indicate an area in which the additional-system-information message associated with the system information index is applicable.

3. The integrated circuit according to claim 1, wherein the area pointer indicates a list number in an area type list, wherein each item in the area type list is associated with a list number and an area type,
the processing circuitry, in operation, determines the list number associated with the area type for which the additional-system-information message is applicable, and sets the area pointer in the system information index for that additional-system-information message to indicate the determined list number, and the area type is one of the following: a tracking area, a radio access network (RAN)-based notification area, a closed subscriber group area, a radio cell, or a system information area.

4. The integrated circuit according to claim 1, wherein the processing circuitry, in operation, generates the system information index which includes the value tag and an identification of a system information area.

5. The integrated circuit according to claim 1, wherein the area pointer indicates a list number in an area list, wherein each item in the area list is associated with a list number and an area identification, the processing circuitry, in operation, determines the list number associated with the area identification for which the additional-system-information is applicable, and sets the area pointer in the system information index for that additional-system-information message to indicate the determined list number, and the processing circuitry, in operation, generates the minimum-system-information message which includes the area list.

6. The integrated circuit according to claim 1, comprising:

receiving circuitry, which, in response to the user equipment moving to a second radio cell under control of a second radio base station, receives from the second radio base station at least one system information index associated with one additional-system-information message that the user equipment is able to acquire in the second radio cell, wherein the transmitting circuitry, in operation, transmits the received at least one system information index relating to the second radio cell to the user equipment, the receiving circuitry, in operation, receives from the user equipment a request for acquiring the one additional-system-information message indicated in the system information index relating to the second radio cell, and the request is received by the receiving circuitry in a message of a random access channel procedure performed between the user equipment and the second radio base station.

* * * * *